United States Patent
Wu et al.

(10) Patent No.: US 10,238,046 B2
(45) Date of Patent: *Mar. 26, 2019

(54) VEGETABLE PRESERVATION AND GROWING CASE AND PIPE CONNECTION CONTROL METHOD FOR VEGETABLE PRESERVATION AND GROWING CASE

(71) Applicants: HAIER GROUP CORPORATION, Qingdao, Shandong (CN); QINGDAO HAIGAO DESIGN & MANUFACTURING CO.,LTD, Qingdao, Shandong (CN)

(72) Inventors: Jian Wu, Shandong (CN); Shu Zhou, Shandong (CN); Zhaojun Fei, Shandong (CN); Haibo Liu, Shandong (CN)

(73) Assignees: HAIER GROUP CORPORATION, Qingdao, Shandong (CN); QINGDAO HAIGAO DESIGN & MANUFACTUING CO., LTD, Qingdao, Shandong (CN)

(*) Notice: Subject to any disclaimer, the term of this patent is extended or adjusted under 35 U.S.C. 154(b) by 489 days.

This patent is subject to a terminal disclaimer.

(21) Appl. No.: 14/894,882

(22) PCT Filed: Mar. 31, 2014

(86) PCT No.: PCT/CN2014/074367
§ 371 (c)(1),
(2) Date: Nov. 30, 2015

(87) PCT Pub. No.: WO2014/190798
PCT Pub. Date: Dec. 4, 2014

(65) Prior Publication Data
US 2016/0113221 A1    Apr. 28, 2016

(30) Foreign Application Priority Data

May 30, 2013 (CN) .......................... 2013 1 0209292
May 30, 2013 (CN) .......................... 2013 1 0209916

(51) Int. Cl.
*A01G 31/02* (2006.01)
*A01G 31/06* (2006.01)
(Continued)

(52) U.S. Cl.
CPC ............. *A01G 31/02* (2013.01); *A01G 7/045* (2013.01); *A01G 31/06* (2013.01); *A01G 2031/006* (2013.01); *Y02P 60/216* (2015.11)

(58) Field of Classification Search
CPC ......... A01G 31/00; A01G 31/02; A01G 31/06
(Continued)

(56) References Cited

U.S. PATENT DOCUMENTS 2,928,211 A * 3/1960 Martin .................. A01G 31/06
                                                              47/60
3,458,951 A * 8/1969 Martin .................. A01G 31/06
                                                              239/524

(Continued)

FOREIGN PATENT DOCUMENTS

| CN | 2301846 Y | 12/1998 |
| CN | 102461456 A | 5/2012 |
| JP | 2009100656 A | 5/2009 |

OTHER PUBLICATIONS

State Intellectual Property Office of the P.R. China (ISR/CN), "International Search Report for PCT/CN2014/074367", China, dated Jun. 25, 2014.

*Primary Examiner* — David J Parsley
(74) *Attorney, Agent, or Firm* — Tim Tingkang Xia, Esq.; Locke Lord LLP

(57) ABSTRACT

A vegetable preservation and growing case includes a thermally-insulated case body. The thermally-insulated case is
(Continued)

provided therein with at least one vegetable carrying box for use in vegetable growing or preservation. The vegetable carrying box bearing case and the thermally-insulated case body have a pluggable electrical connection and a pluggable water-path connection and allow for disassembly, thus effectively increasing the degree of use convenience.

13 Claims, 5 Drawing Sheets

(51) Int. Cl.
    *A01G 7/04*     (2006.01)
    *A01G 31/00*     (2018.01)

(58) Field of Classification Search
    USPC ................................ 47/48.5, 59 R, 60, 62 R
    See application file for complete search history.

(56) References Cited

U.S. PATENT DOCUMENTS

| | | | | |
|---|---|---|---|---|
| 4,255,897 A * | 3/1981 | Ruthner | ................ | A01G 7/045 47/65 |
| 4,332,105 A * | 6/1982 | Nir | ........................ | A01G 31/02 137/563 |
| 4,869,019 A * | 9/1989 | Ehrlich | ................... | A01G 31/06 47/59 R |
| 4,953,363 A * | 9/1990 | Primozic | ............... | A47F 3/0443 312/116 |
| 5,073,401 A * | 12/1991 | Mohr | ................... | A01G 31/042 426/138 |
| 5,283,974 A * | 2/1994 | Graf, Jr. | ................... | A01G 9/00 47/60 |
| 6,668,486 B2 | 12/2003 | Lo | | |
| 7,278,237 B2 | 10/2007 | Okabe et al. | | |
| 8,151,518 B2 * | 4/2012 | Adams | ................... | A01G 31/06 47/82 |
| 8,234,812 B1 * | 8/2012 | Colless | ................... | A01G 9/16 47/61 |
| 8,418,403 B1 * | 4/2013 | Nuttman | ................ | A01G 9/024 47/82 |
| 8,726,568 B2 * | 5/2014 | Wilson | ................... | A01G 31/00 47/62 R |
| 8,910,419 B1 * | 12/2014 | Oberst | ................... | A01G 31/06 47/60 |
| 8,915,015 B1 * | 12/2014 | Augspurger | ............. | A01G 9/14 47/17 |
| 2011/0173884 A1 * | 7/2011 | He | ....................... | A01G 25/167 47/79 |
| 2012/0054061 A1 * | 3/2012 | Fok | ........................ | A01G 31/00 705/26.5 |

* cited by examiner

VEGETABLE PRESERVATION AND GROWING CASE AND PIPE CONNECTION CONTROL METHOD FOR VEGETABLE PRESERVATION AND GROWING CASE

CROSS-REFERENCE TO RELATED APPLICATIONS

This application claims priority to Chinese Patent Application Nos. 201310209292.5, and 201310209916.3, both filed May 30, 2013 in the State Intellectual Property Office of P.R. China, which are incorporated herein by reference in their entireties.

FIELD OF THE INVENTION

The present invention relates to the field of vegetable growing or preservation technologies, and in particular, to a vegetable preservation and growing case and a pipe connection control method for the vegetable preservation and growing case.

BACKGROUND OF THE INVENTION

An existing water plating box is generally provided with a container for carrying a plant; however, the container for carrying a plant is generally fixedly connected to the water planting box, which is adverse to disassembly and causes inconvenience in use.

In addition, studies find that there is a certain relationship between the freshness of vegetables and illumination. Therefore, some existing refrigerators are provided with illumination apparatuses to illuminate vegetables, so as to retain the freshness of the vegetables. In the existing refrigerator, the illumination apparatus is generally disposed at the top of or on a side wall of the refrigerator. However, there exists the following problems: the interior of the refrigerator is a closed hexahedral storage space, but light emitted by a light source straightly illuminates vegetables at a constant illumination angle; therefore, illumination distribution is uneven in the whole space, and in addition, considering radiation distances and obstacles, some positions are not illuminated, and light utilization is low. Besides, it is of great technical difficulty to dispose a fixed light source inside a thermal insulation case body, and therefore, the structure is usually relatively complicated.

SUMMARY OF THE INVENTION

To solve the foregoing problems, the present invention provides a vegetable preservation and growing case and a pipe connection control method for the vegetable preservation and growing case, which can effectively improve usage convenience.

The present invention provides a vegetable preservation and growing case, including a thermal insulation case body, where at least one vegetable carrying box for vegetable growing or preservation is disposed in the thermal insulation case body, and the vegetable carrying box is connected to the thermal insulation case body by means of a pluggable electric connection and a pluggable water connection.

The present invention further provides a pipe connection control method for the foregoing vegetable preservation and growing case, including: connecting a vegetable carrying box and a thermal insulation case body by means of a pluggable electric connection and a pluggable water connection, and when the electric connection between the vegetable carrying box and the thermal insulation case body is disconnected, disconnecting the water connection simultaneously.

In the vegetable preservation and growing case provided in the present invention, a vegetable carrying box and a thermal insulation case body are connected by means of a pluggable electric connection and a pluggable water connection, and can be disassembled, thereby effectively improving usage convenience.

DETAILED DESCRIPTION OF THE INVENTION

Embodiments of the present invention are described below with reference to the accompanying drawings. Elements or features described in one figure or one implementation manner of the present invention may be combined with elements and features shown in one or more other figures or implementation manners. It should be noted that, for the purpose of clarity, representations and descriptions of parts and processing that are irrelevant to the present invention and known to one of ordinary skill in the art are omitted in the accompanying drawings and illustration.

Figure 1:
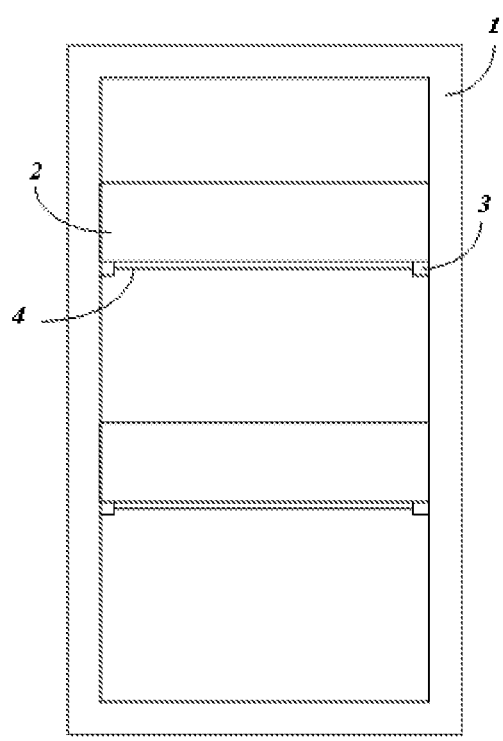
FIG. 1 is a partial schematic structural diagram of an embodiment of a vegetable preservation and growing case according to the present invention.

Embodiment of a vegetable preservation and growing case:

As shown in FIG. 1, a vegetable preservation and growing case provided by this embodiment includes a thermal insulation case body 1, where at least one vegetable carrying box 2 for vegetable growing or preservation is disposed in the thermal insulation case body 1, and the vegetable carrying box 2 is connected to the thermal insulation case body 1 by means of a pluggable electric connection and a pluggable water connection.

The vegetable carrying box 2 and the thermal insulation case body 1 are connected by means of a pluggable electric connection and a pluggable water connection, and can be disassembled. A user can pull out the vegetable carrying box 2, so as to put vegetable seedling into the vegetable carrying box 2, thereby effectively improving usage convenience.

Specifically, a back portion of thermal insulation case body 1 is provided with a circulation pipeline for circularly supplying a nutrient solution to each vegetable carrying box 2, a water tank is disposed below the thermal insulation case body 1, the water tank contains the nutrient solution, and the nutrient solution is delivered to the circulation pipeline by using a water pump.

Figure 2:
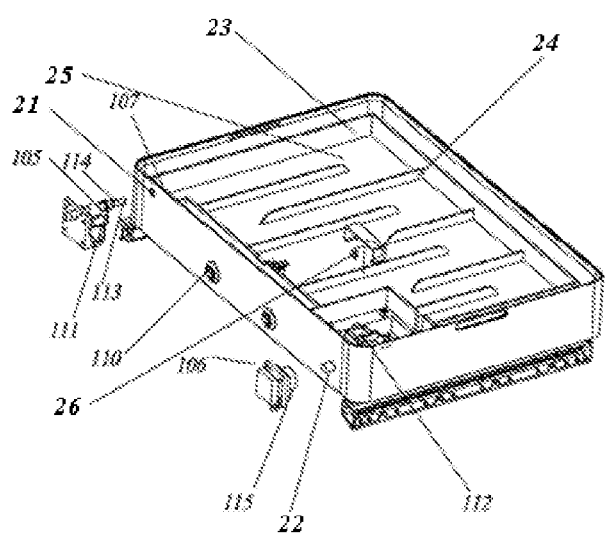
FIG. 2 is an exploded diagram of some components in the vegetable preservation and growing case in FIG. 1.

As shown in FIG. 2, the vegetable carrying box 2 includes a solution carrying case 23 provided with a high-level liquid inlet 21 and a low-level liquid outlet 22 that are opposite to each other; an area, which is between the high-level liquid inlet 21 and the low-level liquid outlet 22, of the solution carrying case 23 is provided with protruding diversion partitions 24 to form a zigzag flow passage 25; and an atomizer 26 is disposed in the flow passage 25. The high-level liquid inlet 111 and the low-level liquid outlet 112 are in communication with the circulation pipeline.

The circulation pipeline includes a nutrient solution feed branch and a nutrient solution backflow branch, where the feed branch is in communication with the high-level liquid inlet 21, and the backflow branch is in communication with the low-level liquid outlet 22.

The thermal insulation case body 1 is provided with a first water swivel 105 for supplying the nutrient solution to the vegetable carrying box 2 and a second water swivel 106 for discharging the nutrient solution. The first water swivel 105 is connected to the high-level liquid inlet 21 in a pluggable manner, and the low-level liquid outlet 22 is connected to the second water swivel 106 in a pluggable manner. The first water swivel 105 and the second water swivel 106 are in communication with the feed branch and the backflow branch, respectively. The nutrient solution flows out of the first water swivel 105, enters into the solution carrying case 23 through the high-level liquid inlet 21, flows along the zigzag flow passage 25 under the action of gravity, and fills up the entire flow passage 25, until being discharged from the low-level liquid outlet 22. The nutrient solution flows along the zigzag flow passage 25, so that the nutrient solution flows through every corner of the solution carrying case 23, ensuring the freshness and nutrition uniformity of the nutrient solution throughout the entire solution carrying case 23.

The nutrient solution flows out from the low-level liquid outlet 22, flows to the backflow branch through the second water swivel 106, and finally flows into the water tank under the action of gravity.

As an optional implementation manner, the high-level liquid inlet 21 and the low-level liquid outlet 22 are correspondingly provided on a same side of the vegetable carrying box 2.

An inner wall of the solution carrying case 23 is provided with an elastic sheet 107 corresponding to the high-level liquid inlet. In a free state, the elastic sheet 107 can cover the high-level liquid inlet 21 to prevent the nutrient solution in the vegetable carrying box 2 from flowing out, and when the first water swivel 105 is inserted into the high-level liquid inlet 21, the elastic sheet 107 is pushed aside, and the first water swivel 105 is in communication with the interior of the solution carrying case 23; when the first water swivel 105 is separated from the high-level liquid inlet 21, the elastic sheet 107 is restored and covers the high-level liquid inlet, so as to prevent the nutrient solution in the solution carrying case 23 from flowing out.

As an optional implementation manner, a circuit component is disposed in the thermal insulation case body 1; an atomizer 26 is disposed in the solution carrying case 23, where the atomizer 26 is configured to atomize the nutrient solution in the vegetable carrying box 2, so that the nutrient solution uniformly volatilizes to an upper space of the vegetable carrying box in a form of mist, to facilitate absorption by a vegetable, and meeting a nutrition requirement of vegetable growth. In addition, the atomizer 26 may be used to control an atomization amount of the nutrient solution, so as to control a growth speed of the vegetable, so that the vegetable is correspondingly in a regular growth state, a slow growth state, or a zero growth state, to extend a preservation time of the vegetable. Especially, when the vegetable is in the zero growth state, the freshness of the vegetable can be retained for a longer time.

Figure 3:
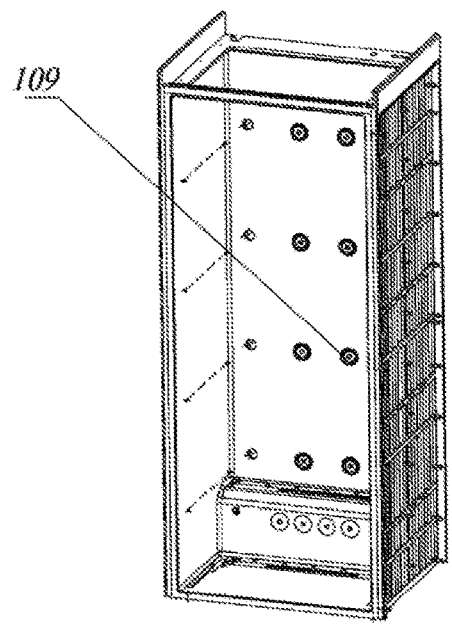
FIG. 3 is a schematic structural diagram of a thermal insulation case body in the vegetable preservation and growing case in FIG. 1.

As shown in FIG. 2 and FIG. 3, the thermal insulation case body 1 is provided with a first electromagnetic connection portion 109, and the vegetable carrying box 2 is correspondingly provided with a second electromagnetic connection portion 110. The second electromagnetic connection portion 110 and the first electromagnetic connection portion 109 are connected in a pluggable manner, and the circuit component is controlled, according to a plug/unplug state between the first electromagnetic connection portion 109 and the second electromagnetic connection portion 110, to be connected to or disconnected from the atomizer 26. When the second electromagnetic connection portion 110 and the first electromagnetic connection portion 109 are connected, an electric connection between the circuit component and the atomizer 26 is established.

As shown in FIG. 2, a first solenoid valve 111 is cooperatively connected to the first water swivel 105. The first solenoid valve 111 is in linkage with the first electromagnetic connection portion 109 and the second electromagnetic connection portion 110. According to the plug/unplug state between the first electromagnetic connection portion 109 and the second electromagnetic connection portion 110, the circulation pipeline is controlled to be connected to or disconnected from the nutrient solution feed branch of the corresponding vegetable carrying box 2. When the second electromagnetic connection portion 110 is separated from the first electromagnetic connection portion 109, that is, when the vegetable carrying box 2 is pulled out, the first solenoid valve 111 is closed, and the first water swivel 105 stops supplying the nutrient solution to the solution carrying case 23; on the contrary, when the first electromagnetic connection portion 109 and the second electromagnetic connection portion 110 are connected, the first solenoid valve 111 is open, to supply the nutrient solution to the corresponding solution carrying case 23.

In addition, a second solenoid valve 112 corresponding to the low-level liquid outlet 106 is disposed in the solution carrying case 23. The second solenoid valve 112 is in linkage with the second electromagnetic connection portion 110 and the first electromagnetic connection portion 109. According to the plug/unplug state between the first electromagnetic connection portion 109 and the second electromagnetic connection portion 110, the nutrient solution backflow branch from the corresponding vegetable carrying box to the circulation pipeline is controlled to be on/off. When the first electromagnetic connection portion 109 is separated from the second electromagnetic connection portion 110, that is, when the vegetable carrying box 2 is pulled out, the second solenoid valve 112 is closed, so as to prevent the nutrient solution in the vegetable carrying box 2 from flowing out.

When the vegetable carrying box 2 is pulled out, the water connection and electric connection to the thermal insulation case body 1 are disconnected, which can prevent the nutrient solution in the circulation pipeline and the solution carrying case 23 from flowing out, thereby ensuring electric insulation inside the thermal insulation case body 1, and effectively improving the safety.

As an optional implementation manner, the first water swivel 105 includes a first steel-core joint 113 and a flexible material layer 114 that is wrapped around the first steel-core joint. The flexible material layer 114 can fill a gap between the first steel-core joint 113 and the high-level liquid inlet 21, to prevent water leakage and fine-tune a plugging position when there is a slight mismatch during a plugging process.

As an optional implementation manner, the second water swivel 106 includes a second steel-core joint 115 fitting the low-level liquid outlet 22.

As an optional implementation manner, as shown in FIG. 1, slides 3 are symmetrically disposed on two sides in the thermal insulation case body 1, where a tray 4 slidable along the slides 3 is disposed on the slides 3 cooperatively. The vegetable carrying box 2 is disposed on the tray 4 in a separable manner, and the vegetable carrying box 2 is disposed on the tray 4 and can slide on the slides 3 along with the tray 4. When a user needs to take out the vegetable carrying box 2, the user may drag the tray 4, which is relatively labor-saving.

In the vegetable preservation and growing case provided in this embodiment, a vegetable carrying box 2 and a thermal insulation case body 1 are connected by means of a pluggable electric connection and a pluggable water connection, and can be disassembled, so that the vegetable carrying box 2 can be conveniently drawn out from the thermal insulation case body 1, which facilitates pick-and-place of vegetables and maintenance, thereby effectively improving usage convenience. When the vegetable carrying box 2 is pulled out, the water connection and electric connection to the thermal insulation case body 1 are disconnected, which can prevent a nutrient solution in a circulation pipeline and a solution carrying case from flowing out, thereby ensuring electric insulation inside the thermal insulation case body, and effectively improving safety. In addition, each vegetable carrying box 2 is enabled to work independently, and after one vegetable carrying box is taken out of the thermal insulation case body 1, normal operation of other vegetable carrying boxes is not affected. An atomizer 26 is used to atomize the nutrient solution, which facilitates nutrition absorption by vegetables, and by setting a tray 4, it is more labor-saving when a user takes out the vegetable carrying box 2.

Figure 4:
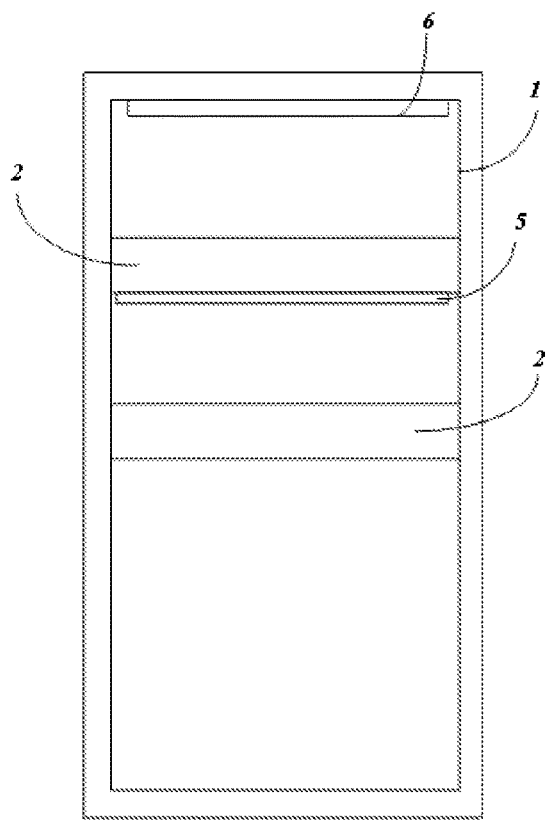
FIG. 4 is a schematic structural diagram of a vegetable carrying box, a first illumination component, a second illumination component, and a thermal insulation case body in a vegetable preservation and growing case according to the present invention.

As shown in FIG. 4, at least two vegetable carrying boxes 2 are disposed in parallel at intervals in a vertical direction. The vegetable preservation and growing case further includes a first illumination component 5, which is disposed at the bottom of an upper vegetable carrying box 2 and is configured to illuminate a lower vegetable carrying box 2.

Vegetable preservation and growth need illumination, and the illumination component at the bottom of the upper vegetable carrying box 2 is used to illuminate the lower vegetable carrying box 2, so that sufficient light is radiated to the lower vegetable carrying box 2, which effectively improves light utilization, reduces difficulty of setting a light source in the thermal insulation case body, simplifies the structure, and facilitates illumination regulation for vegetable preservation or growing.

Figure 5:
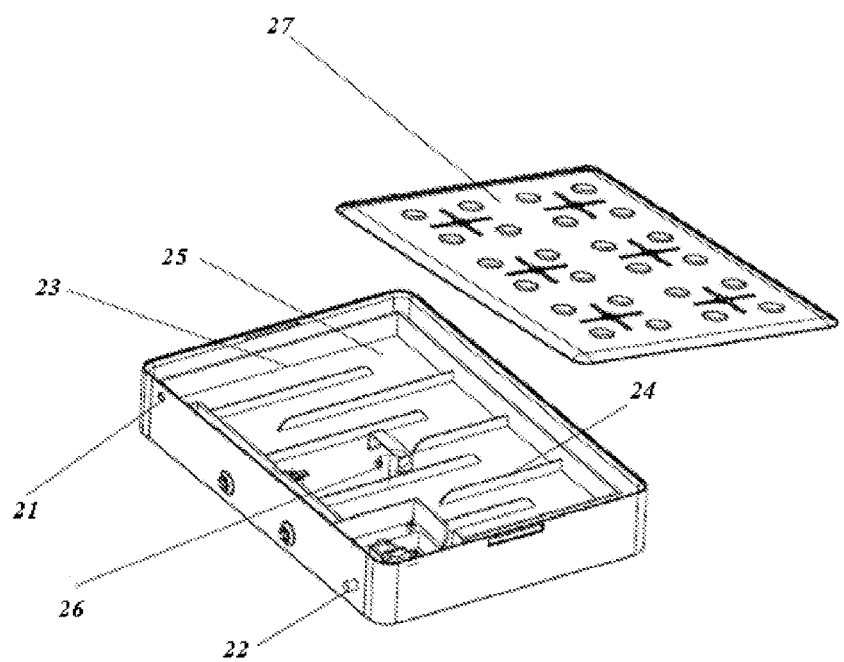
FIG. 5 is a schematic structural diagram of the vegetable carrying box in FIG. 4.

As shown in FIG. 5, the vegetable carrying box 2 further includes a vegetable shelf 27 disposed above the solution carrying case 23, and the vegetable shelf 27 is disposed overhead relative to the top of the zigzag flow passage 25.

Figure 6:
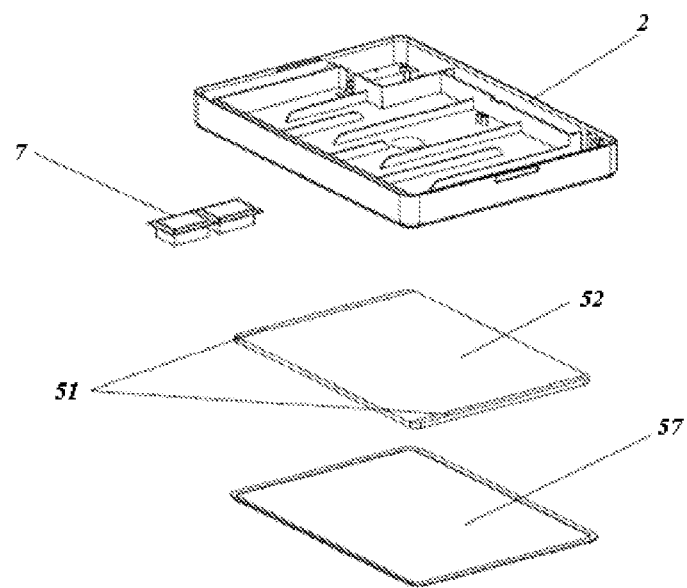
FIG. 6 is an exploded diagram of some components in the vegetable preservation and growing case in FIG. 4.

As shown in FIG. 6, as an optional implementation manner, the first illumination component 5 includes a light source 51 and a light guide plate 52, where the light guide plate 52 is disposed on a light emergent path of the light source 51, and the light guide plate 52 is configured to make light emitted by the light source 51 distributed uniformly.

The light source 51 includes multiple groups of linear light sources that are symmetrically disposed on two sides of the light guide plate 52.

The linear light source includes multiple unit light sources 53 that are arranged linearly.

Figure 7:
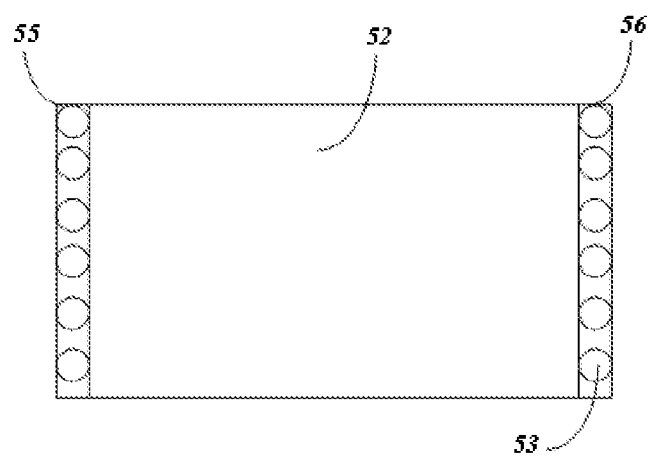
FIG. 7 is a schematic structural diagram of an embodiment of a light source and a light guide plate in the vegetable preservation and growing case in FIG. 4.

As shown in FIG. 7, as an optional implementation manner, the light source 51 includes two groups of linear light sources: a first linear light source 55 and a second linear light source 56, which are separately disposed on two sides of the light guide plate 52.

When the first linear light source 55 or the second linear light source 56 emits light, light is guided by the light guide plate 52, so that the whole light guide plate 52 emits light uniformly, that is, the linear light source is converted into a planar light source. In this way, light utilization can be improved by a maximum degree, and energy consumption can be reduced, thereby effectively saving energy.

As an optional implementation manner, all of the multiple unit light sources 53 may be white light sources; or the multiple unit light sources 53 include at least one red light source and at least one blue light source; or the multiple unit light sources 53 include at least one red light source, at least one blue light source, and at least one white light source. Different groups of people respond differently to red and blue light, and therefore, proportions of light sources can be selected flexibly; a red-blue light source that is most suitable for growth of green plants may be switched to a white light source that is acceptable to most people, or a color composition of a light source at each layer may be set separately, to implement switch between an exhibition state and a state where there is no one around.

As an optional implementation manner, the multiple unit light sources 53 are disposed at the bottom of the vegetable carrying box in a detachable manner, and when a problem occurs in a particular unit light source 53, the unit light source 53 is easy to replace; the user may further set a color of the unit light source according to a requirement.

As an optional implementation manner, the unit light source 53 is a light-emitting diode (LED). The LED does not generate heat when emitting light, and does not affect a temperature in the thermal insulation case body; moreover, the LED has low energy consumption and a long service life, and therefore can effectively save electric energy.

As shown in FIG. 5, to ensure growth of vegetables, humidity in the thermal insulation case body 1 is generally relatively high. To avoid water condensation on a surface of the unit light source 53, the illumination component 5 further includes a lamp shade 57 disposed at a periphery of the light source 53 and the light guide plate 52, where the lamp shade 57 is configured to protect the light source, and is preferably made of a material having high transmittance.

In addition, a second illumination component 6 for illuminating a first-layer vegetable carrying box is further disposed on an inner wall at the top of the thermal insulation case body 1, the quantity of linear light sources and colors of unit light sources in the second illumination component 6 may be the same or different from those of the first illumination component 5.

Different growth stages of vegetables have different requirements on illumination. Therefore, as an optional implementation manner, the vegetable preservation and growing case provided by this embodiment further includes a controller 7 for controlling light source luminance. The controller 7 is separately electrically connected to the first illumination component 5 and the second illumination component 6, and is configured to adjust luminance of the corresponding illumination component 5 or 6 according to an acquired illumination control signal. Light sources of first illumination components 5 disposed at the bottom of different vegetable carrying boxes 2 may be adjusted separately, and the second illumination component 6 may also be adjusted separately.

In the vegetable preservation and growing case provided by the present invention, an illumination component 5 at the bottom of an upper vegetable carrying box 2 and an illumination component 6 are used to illuminate a lower vegetable carrying box 2. Light can be fully and uniformly radiated to the lower vegetable carrying box 2, thereby effectively improving light utilization. A linear light source is converted into a planar light source by using a light guide plate, which is beneficial to energy saving, and in addition, can reduce the difficulty of disposing a light source in a thermal insulation case body.

The present invention further provides a pipe connection control method for the foregoing vegetable preservation and growing case, including: connecting a vegetable carrying box 2 and a thermal insulation case body 1 by means of a pluggable electric connection and a pluggable water connection, and when the electric connection between the vegetable carrying box 2 and the thermal insulation case body 1 is disconnected, disconnecting the water connection simultaneously.

Although the present invention and its advantages have been described in detail, it should be understood that various changes, substitutions and alterations can be made herein without departing from the spirit and scope of the present invention as defined by the appended claims. Moreover, the scope of the present invention is not intended to be limited to the particular embodiments of the process, devices, means, methods and steps described in the specification. As one of ordinary skill in the art will readily appreciate from the disclosure of the present invention, processes, devices, means, methods, or steps, presently existing or later to be developed that perform substantially the same function or achieve substantially the same result as the corresponding embodiments described herein may be utilized according to the present invention. Accordingly, the appended claims are intended to include within their scope such processes, devices, means, methods, or steps.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A vegetable preservation and growing case, comprising:
    a thermal insulation case body, and at least one detachable vegetable carrying box for vegetable growing or preservation disposed in the thermal insulation case body, wherein the detachable vegetable carrying box is connected to the thermal insulation case body by means of a pluggable electric connection and a pluggable water connection,
    wherein the thermal insulation case body is provided with a circulation pipeline for circularly supplying a nutrient solution to the detachable vegetable carrying box, wherein the detachable vegetable carrying box is connected to the circulation pipeline by means of the pluggable water connection;
    wherein the detachable vegetable carrying box comprises a solution carrying case having a high-level liquid inlet and a low-level liquid outlet that are opposite to each other, wherein an inner wall of the solution carrying case comprises an elastic sheet corresponding to the high-level liquid inlet, wherein the elastic sheet is configured to prevent the nutrient solution in the detachable vegetable carrying box from flowing out when the detachable vegetable carrying box is pulled out;
    wherein a first water swivel for supplying the nutrient solution to the detachable vegetable carrying box and a second water swivel for discharging the nutrient solution are disposed in the thermal insulation case body, the first water swivel is pluggably connected to the high-level liquid inlet, the low-level liquid outlet is pluggably connected to the second water swivel, and the first water swivel and the second water swivel are in communication with the circulation pipeline;
    wherein a circuit component is disposed in the thermal insulation case body, the thermal insulation case body and the detachable vegetable carrying box are provided with a corresponding first electromagnetic connection portion and a corresponding second electromagnetic connection portion, respectively, the second electromagnetic connection portion is pluggably electrically connected to the first electromagnetic connection portion, and the circuit component is controlled to be on/off according to a plug/unplug state between the first electromagnetic connection portion and the second electromagnetic connection portion;
    wherein a first solenoid valve is cooperatively connected to the first water swivel; the first solenoid valve is in linkage with the first electromagnetic connection portion and the second electromagnetic connection portion, and is configured to control, according to a plug/unplug state between the first electromagnetic connection portion and the second electromagnetic connection portion, a nutrient solution feed branch from the circulation pipeline to the corresponding detachable vegetable carrying box to be on/off; and
    wherein a second solenoid valve corresponding to the low-level liquid outlet is disposed in the solution carrying case; the second solenoid valve is in linkage with the first electromagnetic connection portion and the second electromagnetic connection portion, and is configured to control, according to a plug/unplug state between the first electromagnetic connection portion and the second electromagnetic connection portion, a nutrient solution backflow branch from the corresponding detachable vegetable carrying box to the circulation pipeline to be on/off,
    such that when the detachable vegetable carrying box is pulled out, both the pluggable electric connection and the pluggable water connection are disconnected simultaneously.

2. The vegetable preservation and growing case according to claim 1, wherein the high-level liquid inlet and the low-level liquid outlet are provided on a same side of the detachable vegetable carrying box.

3. The vegetable preservation and growing case according to claim 1, wherein the first water swivel comprises a first steel-core joint and a flexible material layer that is wrapped around the first steel-core joint.

4. The vegetable preservation and growing case according to claim 1, wherein the second water swivel comprises a second steel-core joint fitting the low-level liquid outlet.

5. The vegetable preservation and growing case according to claim 1, wherein at least two detachable vegetable carrying boxes for vegetable growing or preservation are disposed in parallel at intervals along a vertical direction in the thermal insulation case body, and a first illumination component for illuminating a lower detachable vegetable carrying box is disposed at the bottom of an upper detachable vegetable carrying box.

6. The vegetable preservation and growing case according to claim 1, wherein the first illumination component comprises a light source and a light guide plate disposed on a light emergent path of the light source.

7. The vegetable preservation and growing case according to claim 6, wherein the light source comprises: multiple groups of linear light sources symmetrically disposed on two sides of the light guide plate.

8. The vegetable preservation and growing case according to claim 7, wherein the linear light source comprises multiple unit light sources arranged linearly.

9. The vegetable preservation and growing case according to claim 8, wherein all of the multiple unit light sources are white light sources; or the multiple light sources comprise at least one red light source and at least one blue light source; or the multiple unit light sources comprise at least one red light source, at least one blue light source, and at least one white light source.

10. The vegetable preservation and growing case according to claim 8, wherein the unit light source is a light-emitting diode.

11. The vegetable preservation and growing case according to claim 10, wherein the first illumination component further comprises a lamp shade that is disposed at a periphery of the light source and the light guide plate.

12. The vegetable preservation and growing case according to claim 5, wherein a second illumination component for illuminating a first-layer detachable vegetable carrying box is further disposed on an inner wall at the top of the thermal insulation case body.

13. The vegetable preservation and growing case according to claim 6, further comprising a controller for controlling light source luminance, wherein the controller is separately electrically connected to the first illumination component and the second illumination component, and is configured to adjust luminance of a corresponding illumination component according to an acquired illumination control signal.

* * * * *